United States Patent [19]
Kanazawa

[11] Patent Number: 5,807,480
[45] Date of Patent: Sep. 15, 1998

[54] FILTRATION DEVICE IN A TANK HAVING CONTROL UNIT TO GENERATE HIGH AND LOW TIDES IN TANK

[75] Inventor: Yoshiaki Kanazawa, Tokyo, Japan

[73] Assignee: Jaleco Ltd., Japan

[21] Appl. No.: 738,292

[22] Filed: Oct. 25, 1996

[30] Foreign Application Priority Data

Oct. 27, 1995 [JP] Japan .................................. 7-280696
Oct. 27, 1995 [JP] Japan .................................. 7-280697
Apr. 11, 1996 [JP] Japan .................................. 8-089331

[51] Int. Cl.$^6$ .......................... B01D 17/12; B01D 35/02; A01K 63/04
[52] U.S. Cl. .......................... 210/120; 119/260; 210/121; 210/150; 210/169; 210/416.2; 210/472
[58] Field of Search ................ 210/97, 98, 138, 210/120, 121, 436, 472; 123/150, 151, 169, 416.2, 615; 119/259–261

[56] References Cited

U.S. PATENT DOCUMENTS

| | | | |
|---|---|---|---|
| 5,097,795 | 3/1992 | Adey ........................................ | 119/259 |
| 5,160,607 | 11/1992 | Thiemer et al. ....................... | 210/128 |
| 5,160,622 | 11/1992 | Gunderson et al. ................... | 210/617 |
| 5,494,581 | 2/1996 | Hobson ................................... | 210/150 |
| 5,567,315 | 10/1996 | Weidenmann et al. ................ | 210/169 |
| 5,647,983 | 7/1997 | Limcaco ................................. | 210/416.2 |

FOREIGN PATENT DOCUMENTS

| | | |
|---|---|---|
| 0453804A | 10/1991 | European Pat. Off. . |
| 0658304A1 | 12/1994 | European Pat. Off. . |
| 2700030A1 | 7/1978 | Germany . |
| 3805770A1 | 9/1989 | Germany . |

*Primary Examiner*—Joseph W. Drodge
*Attorney, Agent, or Firm*—Rader, Fishman & Grauer; Ronald P. Kananen

[57] ABSTRACT

A filtration device for filtering and cleaning water to be supplied to a water tank comprises a main body having an upper end opening selectively closed by a lid mounted thereon in an installed state, a filtering unit detachably disposed in the main body, an air exhaust element communicating with an inside and outside of the main body, a water inlet connected to the main body, a feed water pipe connected to the water inlet for supplying water into the main body, a drainage pump for draining clean water cleaned up by the filtering unit, a water outlet operatively connected to the filtering unit to supply the cleaned-up water to the water tank, and a flow rate control unit, which is detachably incorporated into the main body and is connected to an inner portion of the water inlet, for controlling a flow rate of raw water, which is introduced from the water inlet to the main body, in a manner that a water level of water contained in the main body alternately has a high-tide water level, at which the filtering unit is covered with water and a low-tide water level which is lower than a location of the filtering unit.

15 Claims, 11 Drawing Sheets

FILTRATION DEVICE IN A TANK HAVING CONTROL UNIT TO GENERATE HIGH AND LOW TIDES IN TANK

BACKGROUND OF THE INVENTION

The present invention relates to a filtration device provided with a tidal type flow rate control unit suitable for intermittently supplying oxygen to aerobic bacteria having adhered to a filter medium (hereunder referred to as a filtering material) or the like for improving the water quality of, namely, cleaning up water contained in an aquarium (water) tank in which aquarium fishes and decorative water weeds are contained together with water.

Generally, when aquarium and hatchery fishes and water weeds or the like are bred in an aquarium tank, organic substances such as residual substances of feed for fishes and excrement of fishes are generated, so that the quality of water contained in the aquarium tank is debased.

Therefore, water stored in an aquarium tank has been filtered by a filter and has thus been cleaned up. However, in recent years, there has been developed a filtration device, by which water contained in an aquarium tank is flowed into a filtering material made of porous ceramics or the like and is filtered. Moreover, the water quality can be further improved, namely, the water can be cleaned up by resolving organic substances by the action of aerobic bacteria living in the water.

An example of the conventional filtration device of such a type is a device which is not built into an aquarium tank itself but is formed as being of the outboard type that communicates with the aquarium tank through a feed water pipe and a drainage pipe. This device is configured so that water contained in the aquarium tank is cleaned up by letting the water flow into the device and thereafter the clean water is put back to the tank again. That is, in the filtration device, a porous filtering material made of ceramics or the like is incorporated into a main body. When the water having been contained in the tank flows through this filtering material, aerobic bacteria or the like, which live in the water, adhere to this filtering material. These aerobic bacteria have ability to resolve organic substances. Thus, the water contained in the tank can be cleaned up by introducing the water to this filtering material through the feed water pipe and letting the water flow into the filtering material. Moreover, the water can be further cleaned up by resolving organic substances by utilizing the aerobic bacteria having adhered to the porous filtering material. Subsequently, the cleaned water is fed back to the tank through the drainage pipe again. The water quality of the water contained in the tank is improved by repeatedly performing such an operation.

Such a conventional filtration device, however, is configured as of the sealed type that always holds the main body thereof in a state in which the main body is filled to the brim thereof with water. Thus, the filtering material, which is incorporated in the main body thereof and contains aerobic bacteria, is immersed in water at all times, so that the aerobic bacteria is activated only by oxygen dissolved in the water. Therefore, an amount of oxygen, which can be supplied to the aerobic bacteria, is small. The conventional filtration device, thus, has problems in that the proliferation of the aerobic bacteria is suppressed, that the efficiency in cleaning up the water is low because of the low activity of the aerobic bacteria and that the lives of the aerobic bacteria are short.

However, in the case that a filtration device of the sealed type is already attached to an aquarium tank, when this filtration device of the sealed type may be simply replaced with another filtration device of a tidal type, this filtration device of the sealed type is wasted and thus such a replacement is wasteful.

SUMMARY OF THE INVENTION

An object of the present invention is to substantially eliminate defects or drawbacks encountered in the prior art and to provide a filtration device having a compact structure capable of changing the operations between a sealed type manner and a tidal type manner easily and quickly.

Another object of the present invention is to provide a filtration device provided with a flow rate control unit of a tidal type, i.e. wet-and-dry type, capable of taking high- and low-tide water level positions of water in a repeated manner in the filtration device for improving the efficiency in cleaning up the water and achieving the long lives of aerobic bacteria owing to the enhancement of the proliferation of the aerobic bacteria and the increase in activity of these aerobic bacteria.

These and other objects can be achieved according to the present invention by providing a filtration device for filtering and cleaning up water to be supplied to a water tank or the like, comprising:

a main body having an upper end opening closably by a lid mounted thereon in an installed state;

a filtering means detachably disposed in the main body;

an exhaust means communicating with inside and outside of the main body;

a water inlet means connected to the main body;

a feed water pipe connected to the water inlet means for supplying raw water into the main body;

a drainage pump means for draining clean water cleaned up by the filtering means;

a water outlet means operatively connected to the filtering means to supply the cleaned-up water to the water tank; and a flow rate control unit, which is detachably incorporated into the main body and is connected to the water inlet means, for controlling a flow rate of raw water, which is introduced from the water inlet means to the main body, in a manner that a water level of water contained in the main body alternately has a high-tide water level, at which the filtering means is covered with water and a low-tide water level which is lower than the location of the filtering means.

In preferred embodiments, the lid mounted to the opening of the main body is provided with communication means to which the exhaust means, the water inlet means and the water outlet means are mounted to be water-tight or air-tight. The exhaust means is an exhaust pipe having one end disposed inside the water tank to a portion above a water level of water in the water tank and adapted to inhale or exhale an air in response to high and low tide operations of the filtration device. The water outlet means is a drainage hose having one end connected to the filtering means. The water inlet means is a water feed hose.

A drainage extension pipe is further disposed to be detachably connected to a suction opening of the drainage pump and is opened at a level lower than the filtering means provided in the main body.

The water feed pipe having an upper end in an installed state communicated water-tightly with the water inlet means and having a lower end closed, the water feed pipe has a side wall to which a plurality of water feed holes are formed, the lower end of the water feed pipe being located in the flow rate control unit. A slider sleeve is further mounted to an outer periphery of the water feed pipe to be axially slidable and an open/close float is mounted to the slider sleeve, which is axially slidable by a floating force of the open/close float.

The filtering means comprises a filter case and a filtering material disposed in a stacked manner in the filter case, the filtering material being composed of a porous material made from such as ceramics or aluminum. The filter case is composed of one side wall section which faces the flow rate control unit and which is formed by a blind plate, other side wall sections and a bottom wall section which are formed with a number of water communication holes. The filter case is composed of an upper stage case element and a lower stage case element stacked vertically and a high-tide water level float and a low-tide water level float are attached to the upper and lower stage case elements, respectively, to be movable. The high- and low-tide water level floats are engageable with the slider sleeve.

The exhaust means may be an exhaust device provided with a float chamber in which a float is disposed and a case body formed with an inlet portion and an outlet portion which are communicated with the float chamber, and the inlet portion is communicated with the main body of the filtration device.

According to the filtration device of the structures described above, the configuration of the filtration device can be changed from that of the tidal type to that of the sealed type easily and quickly by removing the flow rate control unit from the water inlet end portion and simply removing the drainage extension pipe from the suction opening of the drainage pump after removing the top lid from the main body.

Further, the configuration of the filtration device of the sealed type can be changed easily and speedily into that of the tidal type by attaching the flow rate control unit and the drainage extension pipe to the water inlet end portion thereof and the suction opening of the drainage pump thereof, respectively. Namely, one of the configurations of the filtration devices of the tidal type and the sealed type, which becomes unnecessary, can be effectively reused by suitably changing the configuration of the filtration device between those of the tidal type and the sealed type. Further, the water level of the water contained in the main body is controlled by the flow rate control unit in such a manner as to alternately have a high-tide water level and a low-tide water level. Thus, when the water has the low-tide water level, the aerobic bacteria having adhered to the filtering material are exposed to the air, so that the quantity of oxygen to be supplied thereto can be increased. Thereby, the aerobic bacteria can be proliferated and activated. Thus, the efficiency of cleaning up the water can be improved. Moreover, the lives of the aerobic bacteria can be lengthened.

In accordance with the filtration device of the present invention, both of the increase in efficiency in cleaning up the water and the long lives of the aerobic bacteria can be achieved by activating the bacteria when the water level is the low-tide wave level. In addition, a passage, through which the raw water flows at the filter material side, can be partitioned by the blind patch of the filtering material case from a passage through which the water cleaned by the filtering material flows. This prevents the efficiency in cleaning up water from being lowered owing to the mixing of the raw water with the clean water. Further, both of the reduction in number of components and the simplification of the configuration of the device can be achieved because there is no necessity of providing a partitioning wall, which is used for partitioning the passage for the raw water from the passage for the clean water, separately from the case.

Therefore, in accordance with the filtration device of the present invention, air can be drawn from the main body to the exterior. On the other hand, fresh outside air can be supplied into the main body. Thus, the aerobic bacteria having adhered to the filtering material or the like in the main body can breathe in air. Thereby, the aerobic bacteria can be activated. Moreover, the lives of the aerobic bacteria can be lengthened.

Further, because an exhaust hose may be omitted, a sequence of operations of connecting an exhaust hose to the exhaust port of the main body of the filtration device, hanging an end portion of the exhaust hose to the topmost edge of an opening of the aquarium tank and placing the exhaust hose on the surface of the water may be omitted.

Moreover, because an exhaust hose hanging from the aquarium tank can be omitted, the aesthetic outside appearance of the device can be improved. Furthermore, the outside appearance can be prevented from being spoiled by bubbles that are formed on the surface of the water, which is contained in the aquarium tank, from air exhausted thereon from the end of the opening of the exhaust hose.

Further, the exhaust and intake of air are repeatedly performed by using the exhaust hose when a normal operation is carried out. Thus, even if water is accumulated in the exhaust hose owing to some cause, this stagnant water is blown up in the exhaust hose every exhaust or intake. This is very noisy. In the case of the filtration device of the present invention provided with no exhaust hose is omitted, such noises can be prevented from being caused.

Further, even if the water having been contained in the main body of the filtration device flows into the exhaust unit, for example, when the drainage pump stops operating owing to failure or the like, the water can be prevented by the exhaust unit from being drained to the exterior.

The nature and further characteristic features of the present invention will be made more clear from the following descriptions made with reference to the accompanying drawings.

BRIEF DESCRIPTION OF THE DRAWINGS

In the accompanying drawings:

FIGS. 6A and 6B illustrate an operational stage of a flow rate control unit of FIG. 4, in which

FIGS. 7A and 7B illustrate an operational stage of the flow rate control unit of FIG. 4, in which

FIGS. 8A and 8B illustrate an operational stage of the flow rate control unit of FIG. 4, in which

DESCRIPTION OF THE PREFERRED EMBODIMENTS

Hereinafter, a first embodiment of the present invention will be described with reference to FIGS. 1 to 10. Incidentally, in FIGS. 1 to 10, like reference characters designate like or corresponding parts.

Figure 1:
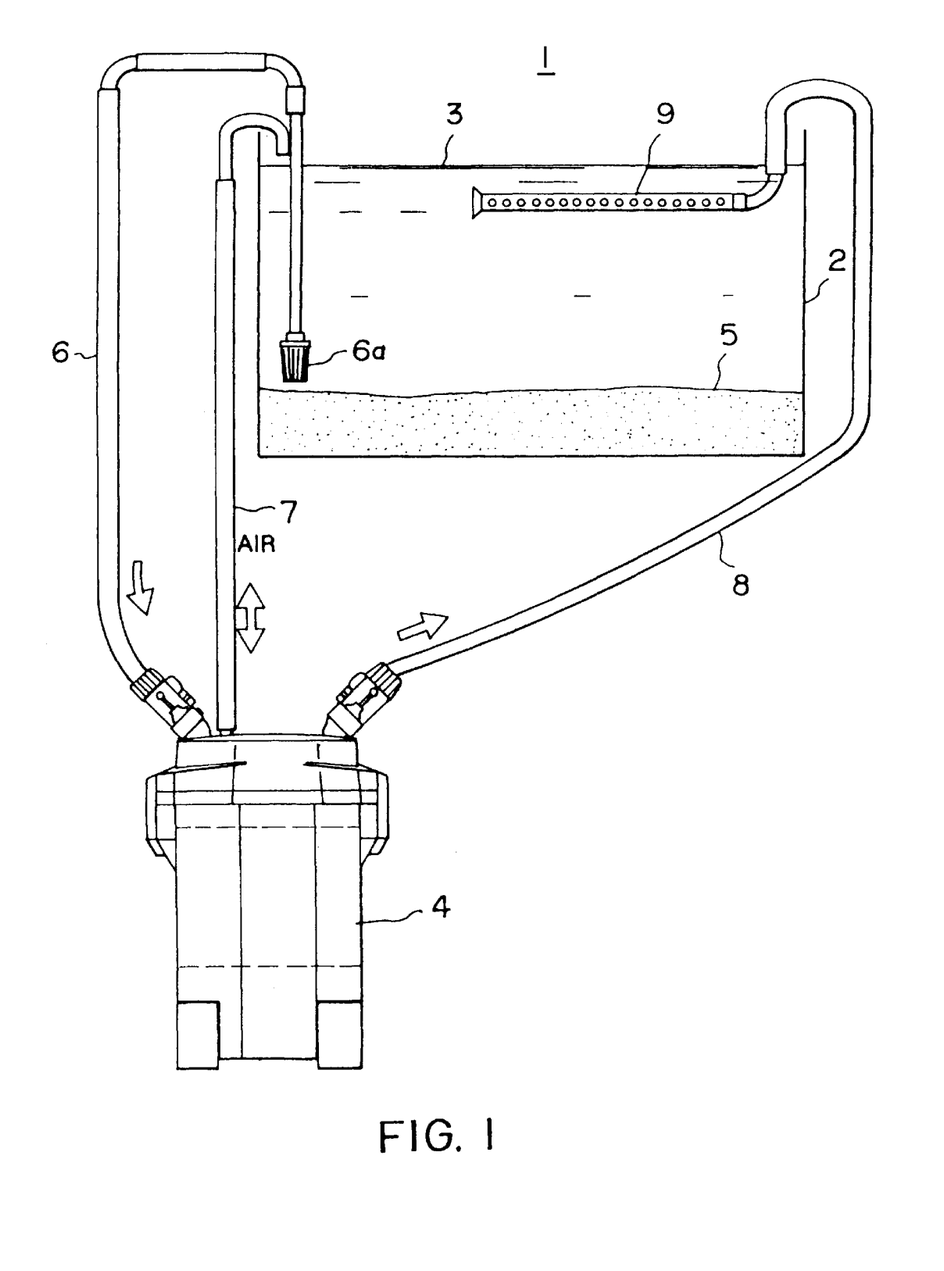
FIG. 1 is a diagram for illustrating an entire configuration of an aquarium unit applicable to the present invention.

FIG. 1 is a diagram for illustrating an entire configuration of an aquarium unit having a filtration device of the present invention, namely, a first embodiment of the present invention. As shown in this FIG. 1, the aquarium unit 1 has a filtration device 4 of the tidal type for cleaning up water 3 contained in the aquarium tank 2, which is provided in the aquarium unit 1.

The aquarium tank 2 accommodates aquarium and hatchery fishes and water weeds or the like together with water therein and has an inner bottom surface on which gravel is placed to entirely cover the same.

On the other hand, the filtration device 4 is placed at a position, which is lower than that of the aquarium tank 2 and is connected to a feed water hose 6, an exhaust hose 7 and a drainage hose 8. The feed water hose 6 has an end portion connected to a strainer 6a in the water contained in the aquarium tank 2. Water 3 filtered by the strainer 6a is supplied to the filtration device 4 by utilizing a natural rise and fall of water levels.

The exhaust hose 7 communicates with the outside air at an opened end portion thereof positioned above the surface of the water 3 and is operative to inhale or exhale the outside air in response to the high and low tide operations of the filtration device 4.

The drainage hose 8 has a water outlet end portion connected to a shower head 9 and is used for showering the water cleaned by the filtration device 4 into the aquarium tank 2 through the shower head 9. Incidentally, the shower head 9 may be omitted.

Further, as shown in FIGS. 2 to 5, the filtration device 4 incorporates a unitized flow rate control unit 11 in a main body casing 10 to be detachable. The main body casing 10 has a top lid 10b attached onto the opened top end portion of a bottomed cylindrical main body 10a with a plurality of bucking devices, not shown. The top lid 10b is integral with or integrally provided with a short-pipe-shape water inlet end portion 6a connected to the feed water hose 6 water-tightly, and with a small-diameter short-pipe-shape exhaust port end portion 7a connected to the exhaust hose 7 air-tightly, and with a short-pipe-shape water outlet end portion 8a connected to the drainage hose 8 water-tightly in such a way that the portions 6a, 7a and 8a project from the top lid 10b.

Figure 4:
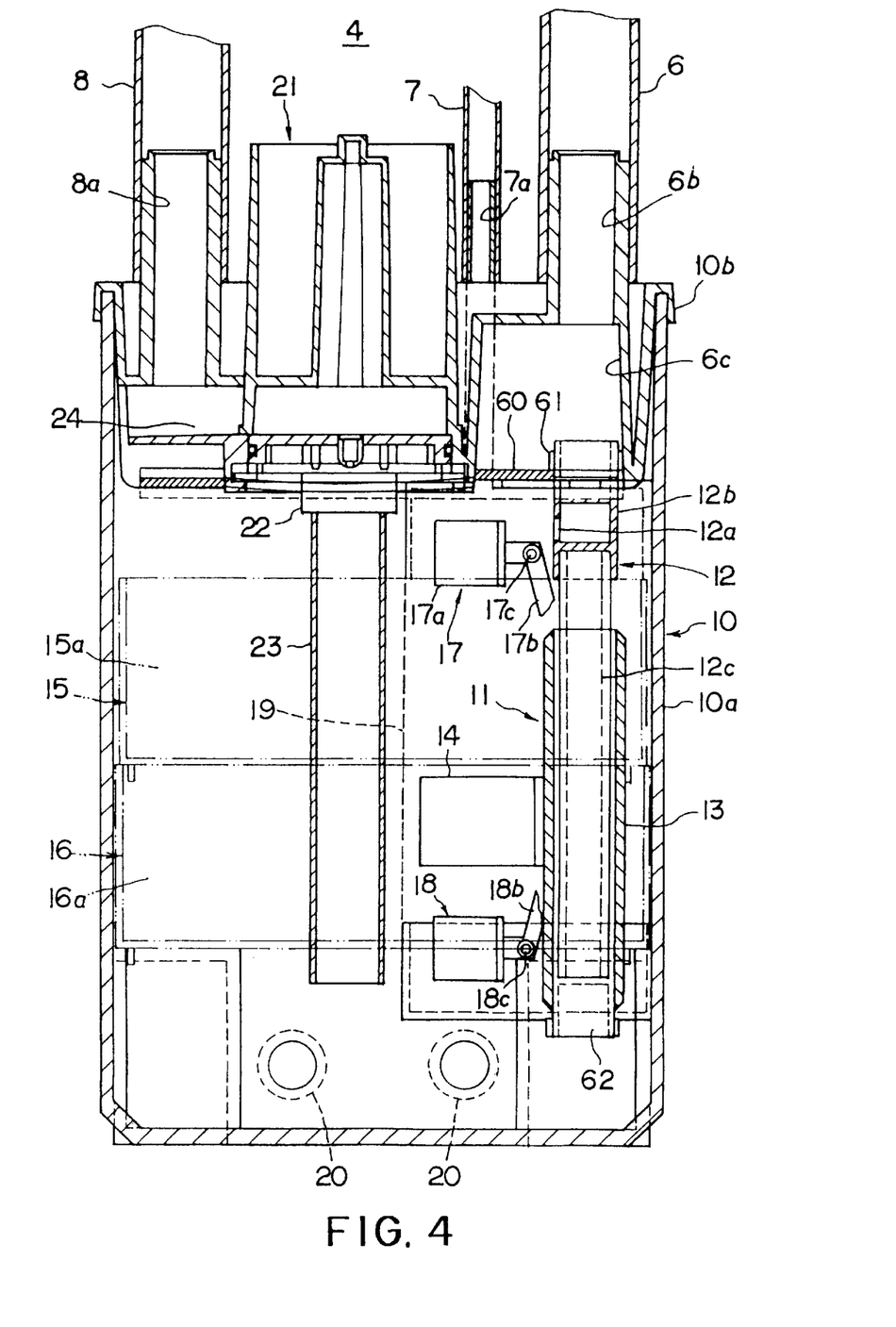
FIG. 4 is a longitudinal sectional view of a filtration device of FIG. 1.

The flow rate control unit 11 is operative to control the feed water flow rate in such a manner that the water level of the water stored in the main body casing 10 alternately has a high-tide water level and a low-tide water level. As illustrated in FIG. 4, the flow rate control unit 11 has an opened top end portion thereof as viewed in this figure, which is detachably water-tightly connected to an inner end part of the short-pipe-shape water inlet end portion 6b of a feed water pipe 12 through a seal, not shown. The feed water pipe 12 has a plurality of water inlets 12a opened in a side surface of the top end portion thereof and further has a sealed-up bottom end portion as viewed in this figure. A slider sleeve 13 is fitted to the outer periphery of the feed water pipe 12 in such a manner capable of sliding in the direction of the axis thereof. An open/close float 14 is fixed to a middle portion in the direction of the axis of the slider sleeve 13. The slider sleeve 13 is adapted to accomplish to-and-fro movements in the direction of the axis of the slider sleeve 13 according to a buoyant force of this float 14.

Figure 5:
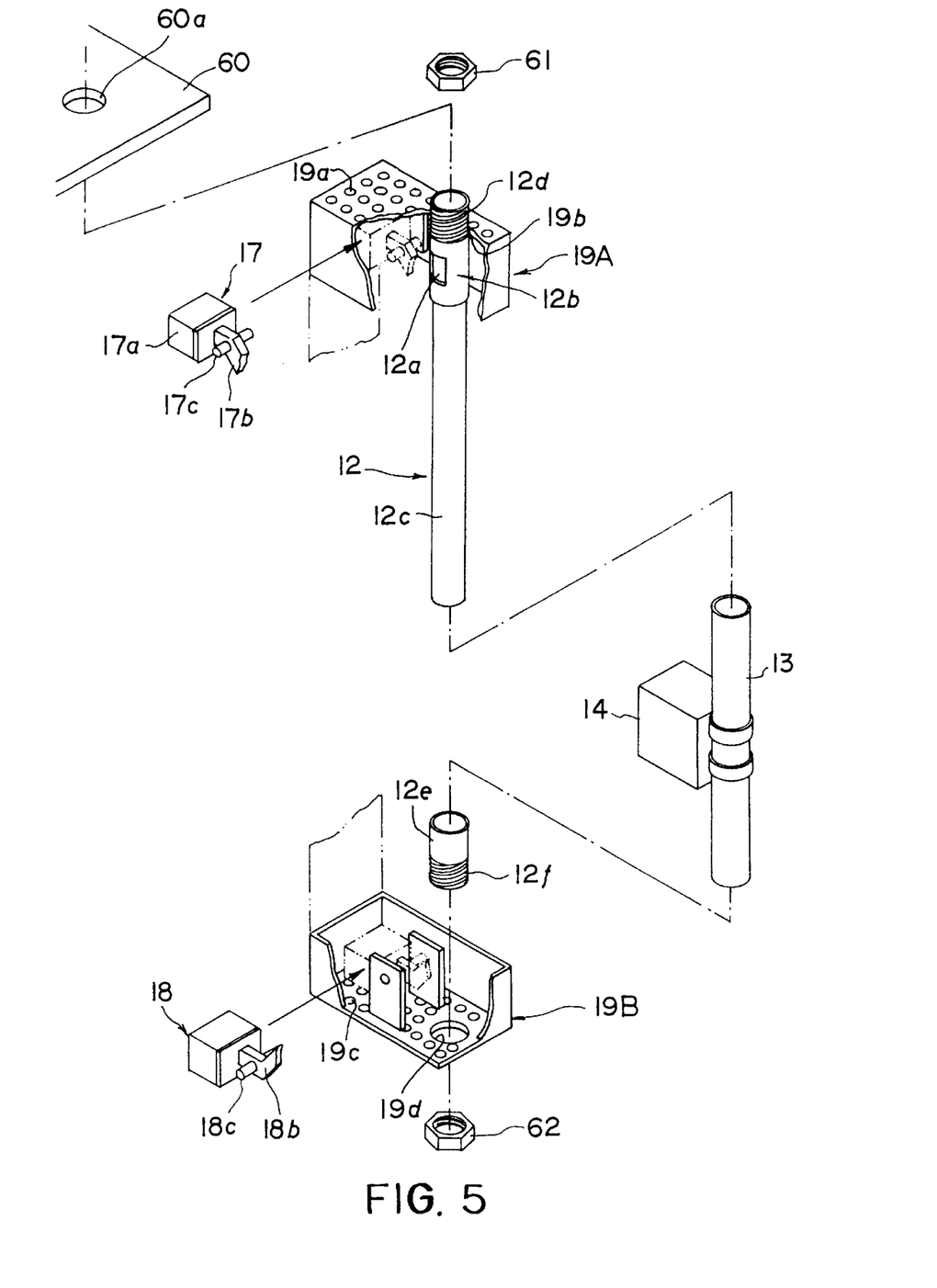
FIG. 5 is a disassembled perspective view of a feed water pipe and elements associated therewith to be incorporated in the filtration device of the present invention.

The feed water pipe 12 is fixed, as shown in the disassembled perspective view of FIG. 5, to the opened upper end portion of a center pipe 12c with an upper end pipe 12b being mounted. The upper end pipe 12b is formed with a plurality of water feed inlets 12a on the side surface thereof. The upper end screwed portion 12d thereof penetrates a hole 19b of the upper end portion 19A of the cover 19 and a hole 60a of the inner partition plate 60 fixed to the upper cover 10b and is screwed with an upper nut 61 to thereby fix the upper end portion 19A and the inner partition plate 60. The upper end portion 19A is perforated with a plurality of water feed holes 19a.

A slider sleeve 13 is mounted to the outer periphery of the center pipe 12a of the water feed pipe 12 to be axially slidable. The open/close float 14 is secured to an axially intermediate portion of the slider sleeve 13 so as to move the slider sleeve 13 reciprocally in the axial direction thereof in accordance with the floating force of the float 14.

On the other hand, a bottomed lower end pipe 12e is mounted to the lower end portion of the center pipe 12a of the water feed pipe 12. The lower end pipe 12e is provided with a lower end screw portion 12f, which penetrates a hole 19d of a lower end portion 19B of the cover 19 and is clamped by a lower nut 62. The lower end portion 19B is perforated with a plurality of water feed holes 19c.

Figure 2:
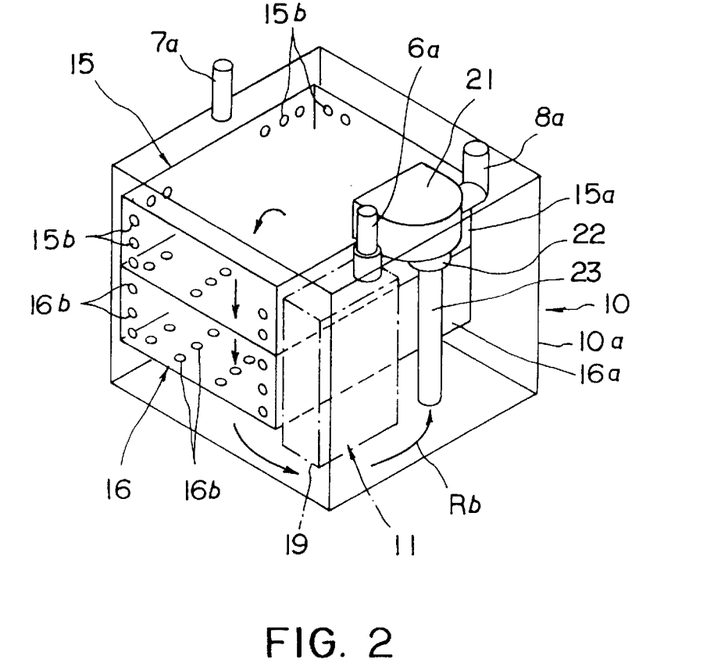
FIG. 2 is a schematic perspective diagram for illustrating a configuration of a main body of a filtration device of tidal type according to one embodiment of the present invention.
Figure 3:
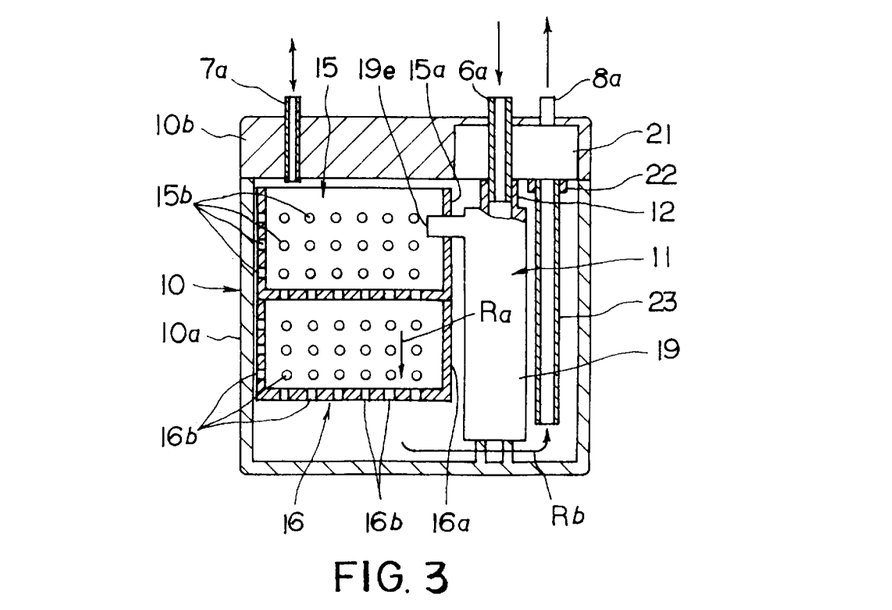
FIG. 3 is a sectional view of the configuration of FIG. 2.

Further, as also illustrated in FIGS. 2 and 3, a plurality of filter cases 15 and 16, each of which is filled with porous filtering materials, not shown, made of ceramics or aluminum, are concentrically stacked as two layers, for instance, upper and lower stages in the main body 10a of the main body casing 10. Aerobic bacteria or the like, which live in the water, adhere to these porous filtering materials when the water having been contained in the tank is passed therethrough. Each of the filter cases 15 and 16 consists of an open-bottomed tube having a rectangular cylindrical shape. Further, side surfaces 15a and 16a, which face the flow rate control unit 11, are constituted by blind patches. On the other hand, a large number of water openings are bored in bottom and side surface portions other than these side surface portions 15a and 16a.

The blind patches acting as the side surfaces 15a and 16a of the filter cases 15 and 16 are configured as partitioning walls for partitioning a passage Ra, for the raw water which is fed by being guided from the water inlet 12a of the flow rate control unit 11 to an upper part of each of the filter cases 15 and 16, from a passage Rb for the clean water cleaned up by being passed through these filter cases 15 and 16. Thus, the raw water can be prevented from being mixed with the clean water. Moreover, because there is no necessity of providing a separate partitioning wall for partitioning both of the passages Ra and Rb, both of the reduction in number of the components and the simplification of the configuration can be achieved.

Further, as illustrated in FIGS. 4 through 7B, the flow rate control unit 11 is provided with a pivotally movable high-tide water level float 17 at a high-tide water level position Wa, at which the top surface of the filter case 15 shown as the upper stage in these figures is covered with water, of the main body casing 10, and on the other hand, with a pivotally movable low-tide water level float 18 at a low-tide water level Wb which is lower than the bottom surface of the filter case 16 serving as a lower stage.

A high-tide water level float 17 has an upper engaging hook fixed to a side surface of a rectangular cylindrical upper float 17a floated on the liquid such as the water to be controlled by the flow rate control unit. The upper engaging hook 17b has an end portion which is downwardly bent at a predetermined angle. The bent end portion thereof is disengageably engaged with the top edge of the slider sleeve 13 as illustrated in, for example, FIG. 6B.

The bent portion of the upper engaging hook 17b is provided with a pin 17c in such a way that the pin 17c penetrates the bent portion thereof in the direction of the thickness thereof and projects therefrom. Both end portions of the pin 17c are rotatably inserted into small holes bored in a pair of left and right support fittings fixed to the inner side surfaces of the top end portion 19A of a rectangular cylindrical cover 19 which is opened at both of the top and bottom ends thereof. When the water level W of the water contained in the main body casing 10 rises up to the high-tide water level Wa, the upper float 17 pivotally moves, so that the upper engaging hook 17b is disengaged from the top edge of the slider sleeve 13. The cover 19 contains the feed water pipe 12, the slide sleeve 13, the high-tide water level float 17 and the low-tide water level float 18. As illustrated in FIG. 3, the cover 19 is integrally formed with a lead-in tube 19e communicating with the water inlet 12a in such a fashion that the lead-in tube 19e projects from the cover 19. The water supplied from the water inlet 12a is guided by the lead-in tube 19e to the upper portion of the upper-stage filter case 15.

On the other hand, the low-tide wave level float 18 has a lower engaging hook 18b fixed to a side surface of the rectangular cylindrical lower float 18a. The lower engaging hook 18b has an end portion which is bent downwardly at a predetermined angle. The bent end portion thereof is disengageably engaged with the bottom edge of the slider sleeve 13, as shown in, for instance, FIG. 8A.

The bent portion of the lower engaging hook 18b is provided with a pin 18c in such a way that the pin 18c penetrates the bent portion thereof in the direction of the thickness thereof and projects therefrom. Both end portions of the pin 18c are rotatably inserted into small holes bored in a pair of left and right support fittings fixed to the inner side surfaces of the lower end portion 19B of the cover 19 which is opened at both of the top and bottom ends thereof. When the water level W of the water contained in the main body casing 10 rises up to the low-tide water level Wb, the lower float 18a pivotally moves, so that the lower engaging hook 18b is disengaged from the bottom edge of the slider sleeve 13. Incidentally, in FIG. 4, reference character 20 designates a heater which is used for heating the water stored in the main body casing 10, as occasion demands, but may be omitted.

Further, the main body casing 10 has an drainage pump 21 provided on the top lid 10b thereof. The drainage pump 21 is adapted to always drain the water stored in the main body casing 10 at a drainage flow rate per unit time which is less than a feed flow rate per unit time by a predetermined flow rate. A suction opening of the drainage pump 21 is opened in the main body casing 10. A drainage extension pipe 23 is detachably provided at the suction-opening side by being fastened with a nipple-like mounting ring 22 rotatably attached thereto. An end of the drainage extension pipe 23 extends to a position which is lower than the bottom surface of the lower-stage filter case 18. The clean water having been cleaned up by each of the filtering materials of the upper-stage and lower-stage filter cases 15 and 16 is sucked into the end of the drainage extension pipe 23 and is then put back into the aquarium tank 2 through a drainage path 24, the water outlet end portion 8a and the drainage hose 8 in sequence.

The tidal operation of the flow rate control unit 11 will be described hereinbelow.

Figure 6A:
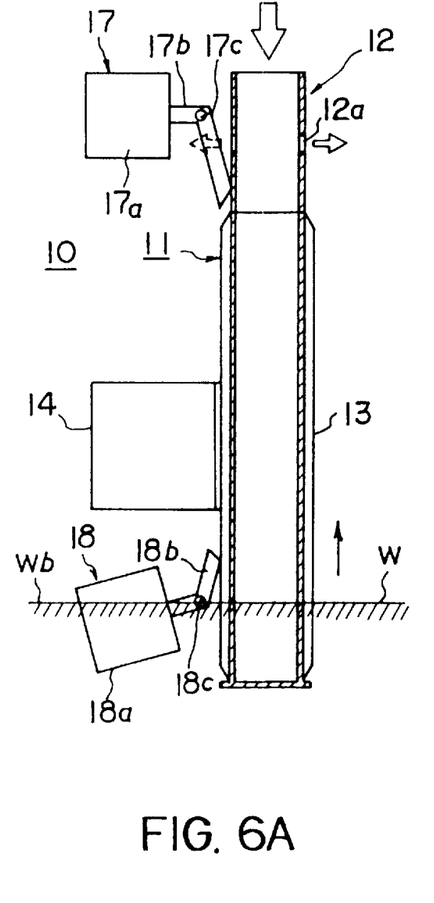
FIG. 6A is a diagram for illustrating an operation at the time when water has a low-tide water level and FIG. 6B is a diagram for illustrating an operation when the water level rises from the low-tide water level.

First, as illustrated in FIG. 6A, when the water level W of the water stored in the main body casing 10 is the low-tide water level Wb, the open/close float 14 is not floated by the stored water, so that the slider sleeve 13 falls to the bottom of the feed water pipe 12 owing to the empty weight thereof and the water inlet 12a opens.

Therefore, as illustrated in FIG. 2, after the water having been stored in the aquarium tank 2 is filtered by the strainer 6a, the water flows into the lead-in pipe 19e from the water inlet 12a through the feed water hose 6 owing to the natural fall. Moreover, the water is fed from this lead-in tube 19e to the upper portion of the filter case 15 in the main body casing 10. During this operation, the drainage pump 21 is operated at all times. Thus, the clean water contained in the main body casing 10 is drained at all times by the drainage extension pipe 23 and the drainage pump 21. The flow rate of the drained water is smaller than the feed water flow rate supplied from the lead-in pipe 19e. The water of an amount, which corresponds to the difference therebetween, is stored in the main body casing 10. The water level W of the water stored therein raises gradually.

Figure 6B:
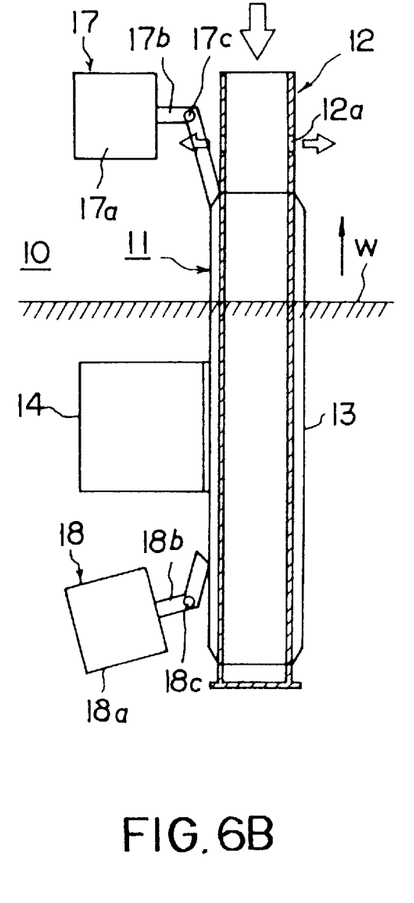

Then, as illustrated in FIG. 6B, when the water level W rises above the open/close float 14, the open/close float 14 is going to float. At that time, the tip end of the upper engaging hook 17b of the high-tide water level float 17 is engaged with the top edge of the slider sleeve 13 as viewed in this figure. Thus, the open/close float 14 cannot float, so that the water inlet 12a remains closed. Consequently, the water is kept supplied from the water inlet 12a.

Figure 7A:
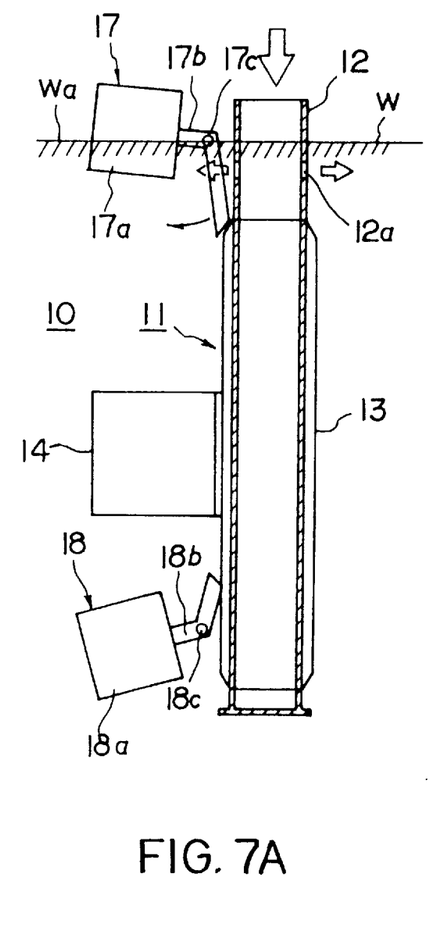
FIG. 7A is a diagram for illustrating an operation at the time when the water level rises up to a high-tide water level and FIG. 7B is a diagram for illustrating an operation of closing a water inlet by using a slider sleeve when the water level reaches the high-tide water level.

The water level W further rises, and when the water level W reaches the high-tide water level Wa as illustrated in FIG. 7A, the upper float 17a floats and moves upwardly and pivotally around the pin 17c. Then, the tip end of the upper engaging hook 17b is leftwardly turned as viewed in this figure. Consequently, the engagement between the tip end of the upper engaging hook 17b and the top edge of the slider sleeve 13 is released.

Figure 7B:
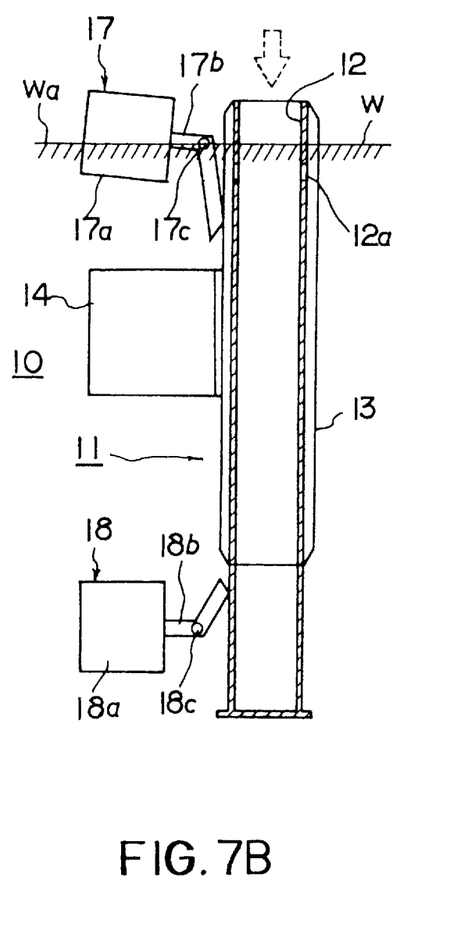

Therefore, as shown in FIG. 7B, the buoyant force of the open/close float 14 causes the slider sleeve 13 to slide on the feed water pipe 12 and moves upwardly as viewed in this figure. Thus, the water inlet 12a is closed by the slider sleeve 13.

Figure 8A:
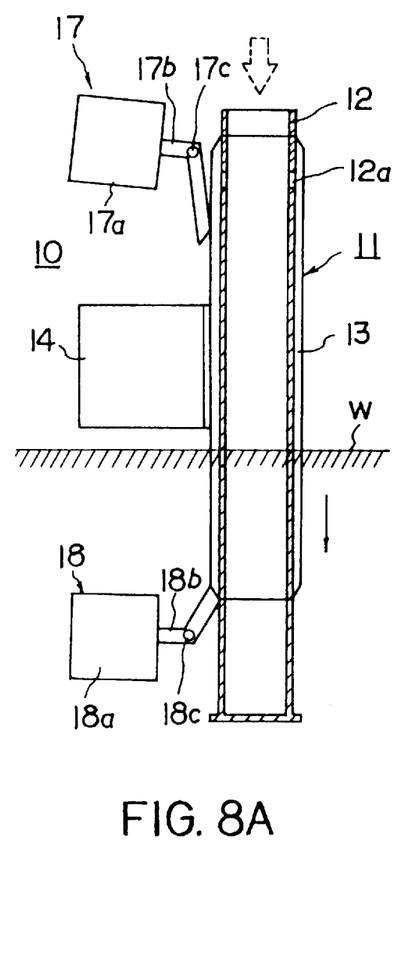
FIG. 8A is a diagram for illustrating an operation at the time when the water level falls from the high-tide water level and FIG. 8B is a diagram for illustrating an operation when the water level is lowered to the low-tide water level.

Accordingly, the feeding of the water from the water inlet 12a is stopped. However, since there is a little clearance between the water inlet 12a and the inner peripheral surface of the slider sleeve 13, a very small amount of water is kept supplied from this clearance. On the other hand, the drainage pump 21 always drains water at a predetermined flow rate. This time, the water level W of the water contained in the main body casing 10 gradually decreases, as illustrated in FIG. 8A. When the water level W becomes lower than the open/close float 14, the slider sleeve 13 is going to fall downwardly owing to the empty weight thereof. At that time, the lower engaging hook of the low-tide water level float 18 is engaged with the bottom edge of the slider sleeve 13 in such a manner as to support the slider sleeve from below. Thus, the slider sleeve 13 cannot fall, so that the water inlet 12a is kept closed.

Figure 8B:
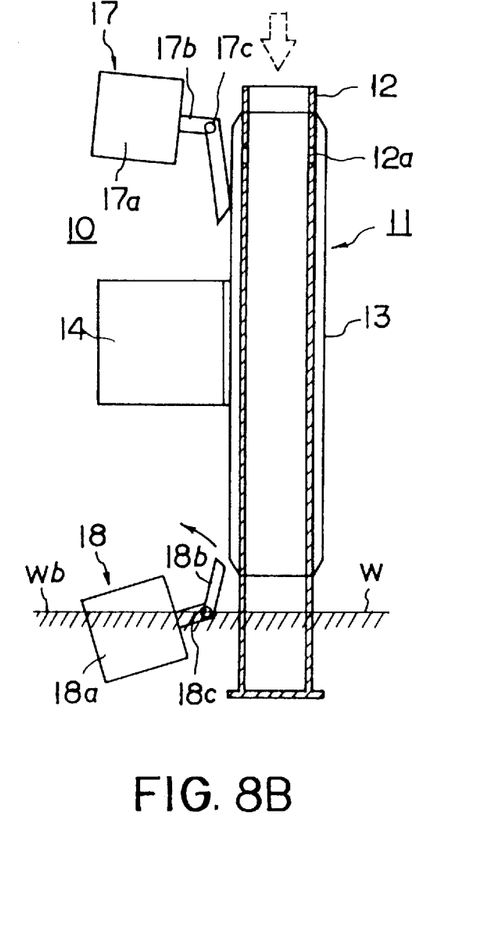

The water level W further lowers, and when the water level W is lowered to the low-tide water level Wb as shown in FIG. 8B, the buoyant force of the lower float 18a is reduced. Therefore, after the engagement between the slider sleeve and the lower engaging hook is forcibly released, the open/close float 14 and the slider sleeve 13 falls further downwardly owing to the empty weight thereof. Consequently, as illustrated in FIG. 6A, the water inlet 12a is opened. Thus, the feeding of the water is started from the water inlet 12a, and the aforementioned operation is repeated.

Therefore, the water level of the water W stored in the main body casing 10 is changed alternately and repeatedly between a low-tide water level Wb and a high-tide water level Wa at a predetermined period. Thus, at the time when the water level is this low-tide water level Wb, the filtering material contained in the main body casing 10 is uncovered from the stored water. Moreover, at such a time, air is supplied from the exhaust hose 7 to the main body casing 10. Thus, the aerobic bacteria having adhered to the porous filtering material can be proliferated and activated by supplying air thereto sufficiently and periodically. Consequently, the ability to resolve organic substances can be further enhanced. Further, the efficiency in cleaning up the water can be improved. Moreover, the lives of the bacteria can be lengthened.

Further, when the water level of the stored water W is raised to the high-tide water level Wa, the top surface or upper portion of the upper-stage filtering material 15 is covered with the stored water W. Thus, the flow rate of the raw water supplied through the filtering material can be increased. Thereby, the efficiency in cleaning up the raw water can be enhanced. Moreover, as a result of the rise of the water surface of the stored water W, the air above the water surface thereof is forced up in the main body casing 10 and is then exhausted to the exterior through the exhaust hose 8. Therefore, the aerobic bacteria having adhered to the filtering material in the main body are allowed to breathe in air.

Further, the flow rate control unit 11 mechanically detects the high-tide water level Wa and the low-tide water level Wb by means of the high-tide water level float 17 and the low-tide water level float 18, respectively. The electrical configuration of the device can be simplified in comparison with the case that the high-tide and low-tide water levels are detected by a lead switch, for example. Moreover, both of the reduction in cost of the device and the simplification of maintenance thereof can be achieved. Furthermore, the water 3 contained in the aquarium tank 2 can be cleaned up by being passed through the filtration device.

Figure 9:
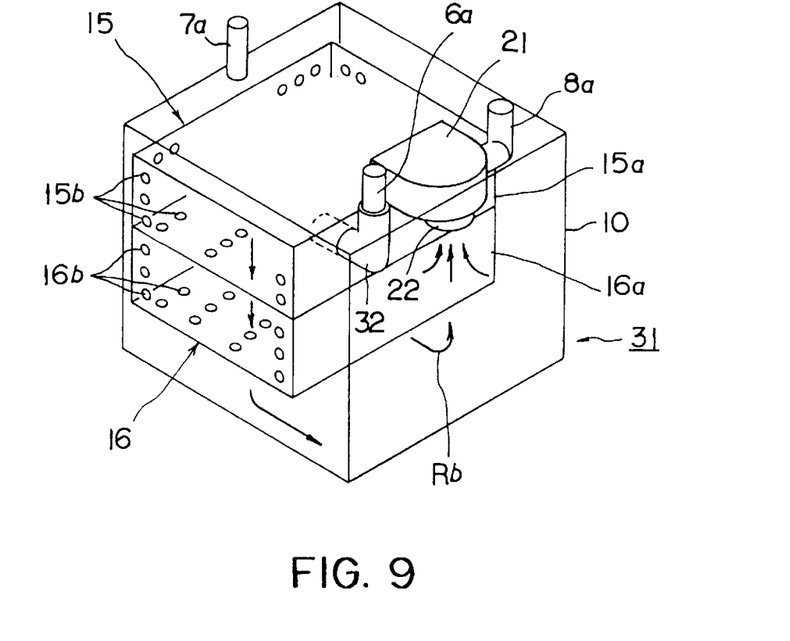
FIG. 9 is a schematic perspective diagram for illustrating the configuration of the main body of a filtration device of a sealed type.
Figure 10:
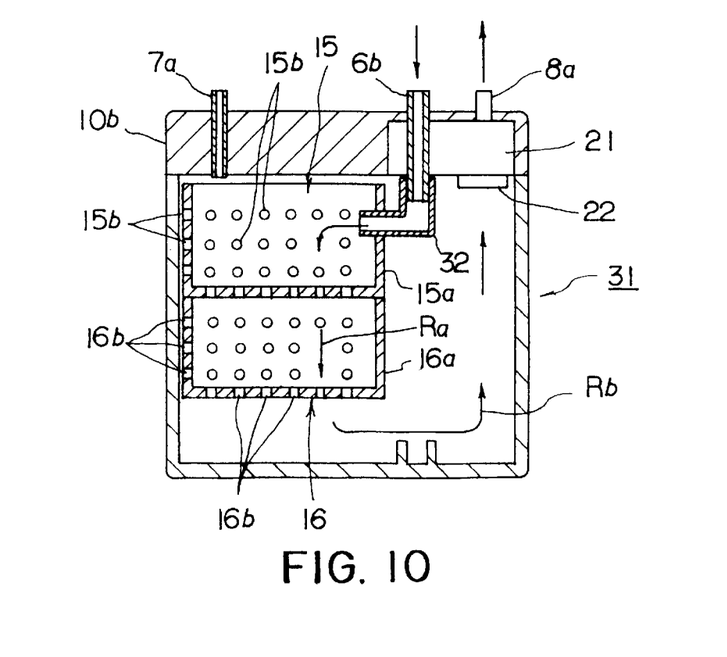
FIG. 10 is a sectional view of the configuration of FIG. 9.

Further, this flow rate control unit of the tidal type is formed as a unit or module. Therefore, as illustrated in FIGS. 9 and 10, the configuration of the filtration device can be changed easily and speedily into that of the filtration device 31 of the sealed type in which the main body casing 10 is always filled with water. Namely, the feed water pipe 12 of the flow rate control unit 11 is detached from the water inlet end portion 6b by being simply strongly pulled out. Moreover, the drainage extension pipe 23 is detached from the suction opening of the drainage pump 21 by unfastening the nipple-like mounting ring 22.

Next, as shown in FIGS. 9 and 10, the configuration of the filtration device can be changed easily and quickly into that of the filtration of the sealed type by strongly pushing an elbow 32 into the inner end portion of the water inlet end portion 6b to thereby attach the elbow 32 thereto detachably and water-tightly. The water outlet end portion of the elbow 32 projects above the upper-stage filter case 15, so that water can be supplied thereto. Incidentally, in the case of this device of the sealed type, the water contained in the main body casing 10 does not have high-tide and low-tide water levels alternately and repeatedly. Thus, the aerobic bacteria can be activated by oxygen dissolved in the water.

Moreover, conversely, the configuration of the filtration device 31 of the sealed type of FIGS. 9 and 10 can be changed easily and speedily into that of the filtration device of the tidal type of FIGS. 2 and 3. Namely, after the elbow 32 is strongly pulled out of the inner end part of the water inlet end portion 6a of FIGS. 9 and 10 and is thus removed therefrom, the configuration of the filtration device of the sealed type can be changed easily and surely into that of the filtration device of the tidal type by strongly pushing the top end portion of the feed water pipe 12 of the flow rate control unit 11 of the tidal type into this water inlet end portion 6a to thereby attach the feed water pipe 12 thereto and by, on the other hand, attaching the drainage extension pipe 23 to the suction opening of the drainage pump 21 as a result of being fastened with the mounting ring 22.

Furthermore, the opened end portion of the exhaust pipe 7 is placed on the aquarium tank 2. Further, even if the water contained in the filtration device 4 is drained through the exhaust hose 7, the drained water can be received by the aquarium tank 2. Therefore, the surroundings can be prevented from being wetted by the drained water. Incidentally, in the foregoing description of the aforementioned embodiment, there has been described the case that the flow rate control unit 11 is mechanically constituted by the low-tide water level float 18 and the high-tide water level float 17. The present invention is not limited to this structure. For example, the flow rate control unit 11 can be configured as of the tidal type that detects the low-tide water level and the high-tide water level by the electrical means such as a lead switch.

Figure 11:
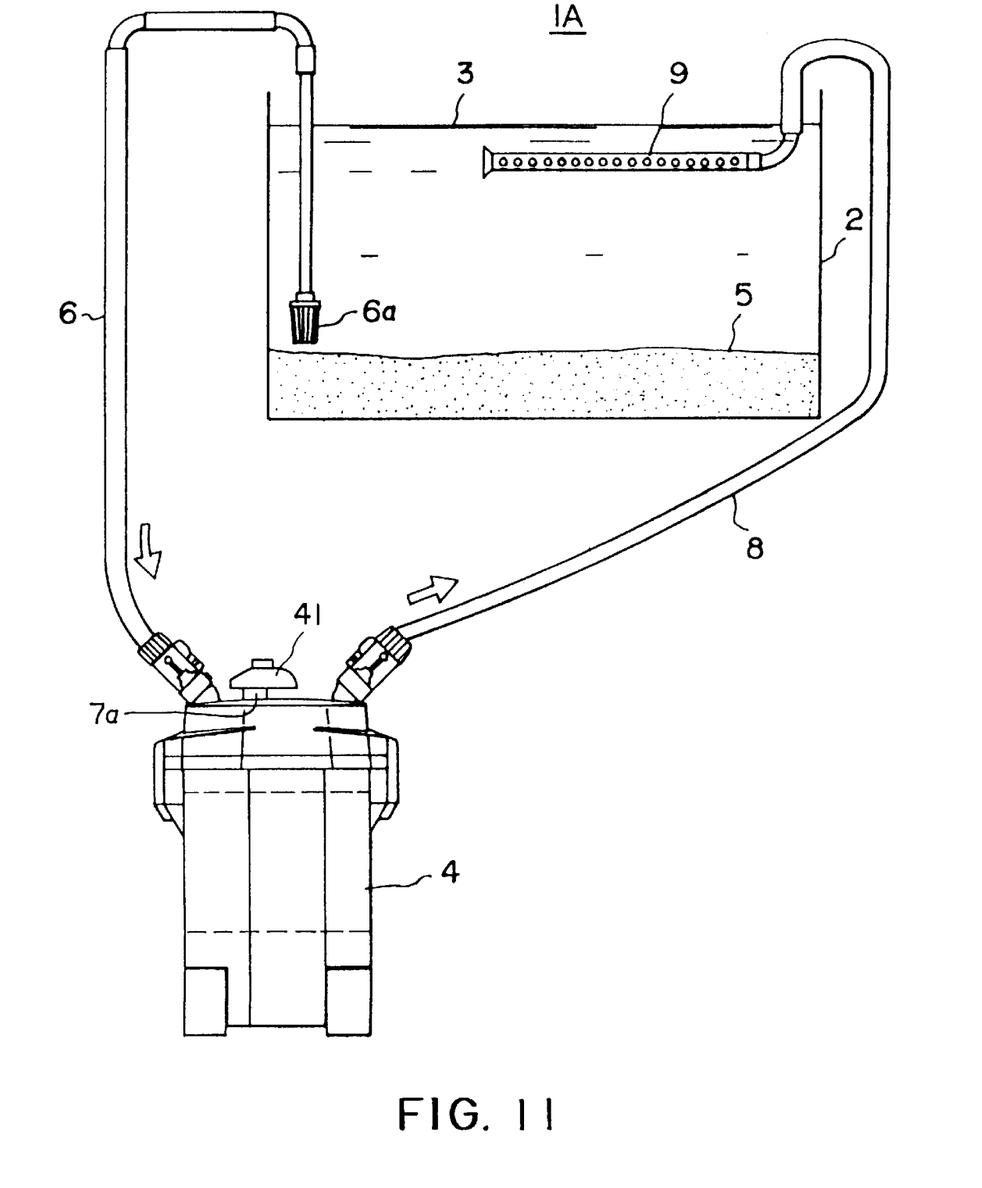
FIG. 11 is a diagram for illustrating the entire configuration of an aquarium unit applicable to another embodiment of the present invention.

FIG. 11 is a diagram for illustrating the entire configuration of a second embodiment of the present invention. A characteristic aspect of this aquarium unit 1A resides in that the exhaust hose 7 of FIG. 1 is omitted and an exhaust unit 41 is detachably attached to the exhaust port end portion 7a of the filtration device 4.

Namely, in the case of using the exhaust hose 7, it is necessary to hang or suspend the opened end portion thereof on the opening end portion of the aquarium tank 1. Such a sequence of operations are troublesome. In addition, the aesthetic outside appearance of the device is spoiled.

Further, in the case of using the exhaust hose 7, the air contained in the main body casing 10 of the filtration device 4 is blown away on the water surface of the water contained in the aquarium tank 2 to the exterior according to the high-tide and low-tide of the water contained in the main body casing 10 thereof and is thus exhausted, while an intake operation of breathing in the outside air is performed. Thus, the filtration device using the exhaust hose provides problems in that many bubbles are formed on the water surface of the water contained in the aquarium tank 2 and that the outside appearance thereof is spoiled.

Further, the exhaust and intake of air are repeatedly performed by using the exhaust hose during a normal operation is carried out. Thus, even if water is accumulated in the exhaust hose owing to some cause, this stagnant water is blown up in the exhaust hose every exhaust or intake. This is very noisy.

Thus, in order to solve such a problem, in the case of this embodiment, the exhaust hose 7 is omitted and the exhaust unit 41 is provided in the device.

Figure 12:
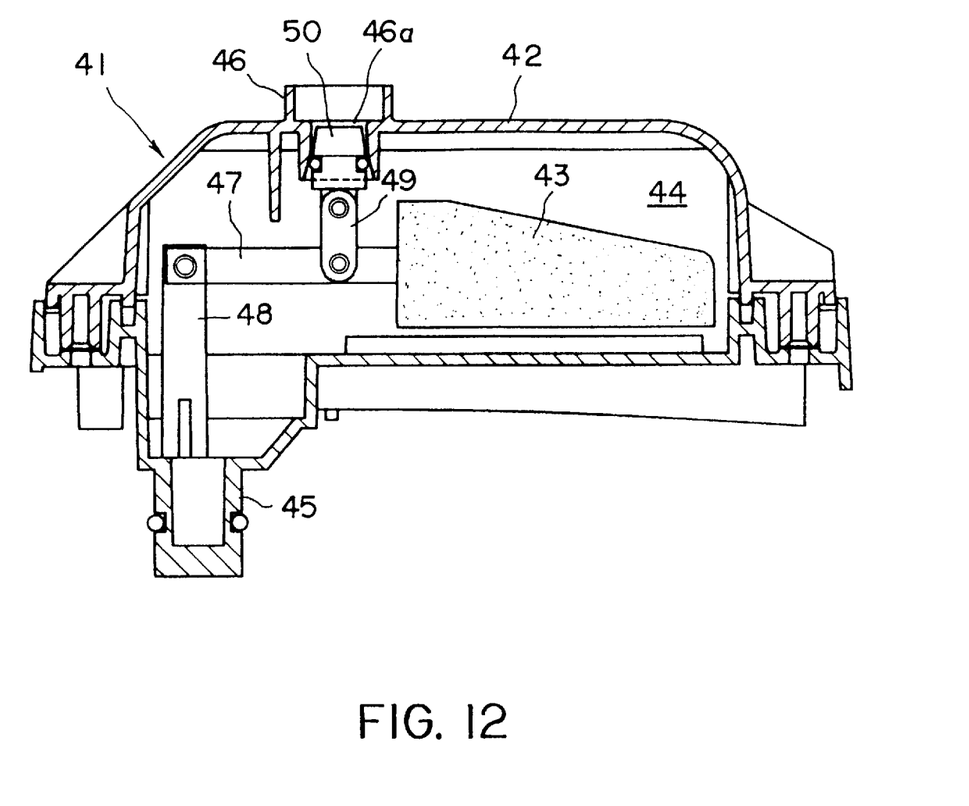
FIG. 12 is a longitudinal sectional view for illustrating a state of an exhaust unit of FIG. 11 prior to an operation thereof.
Figure 13:
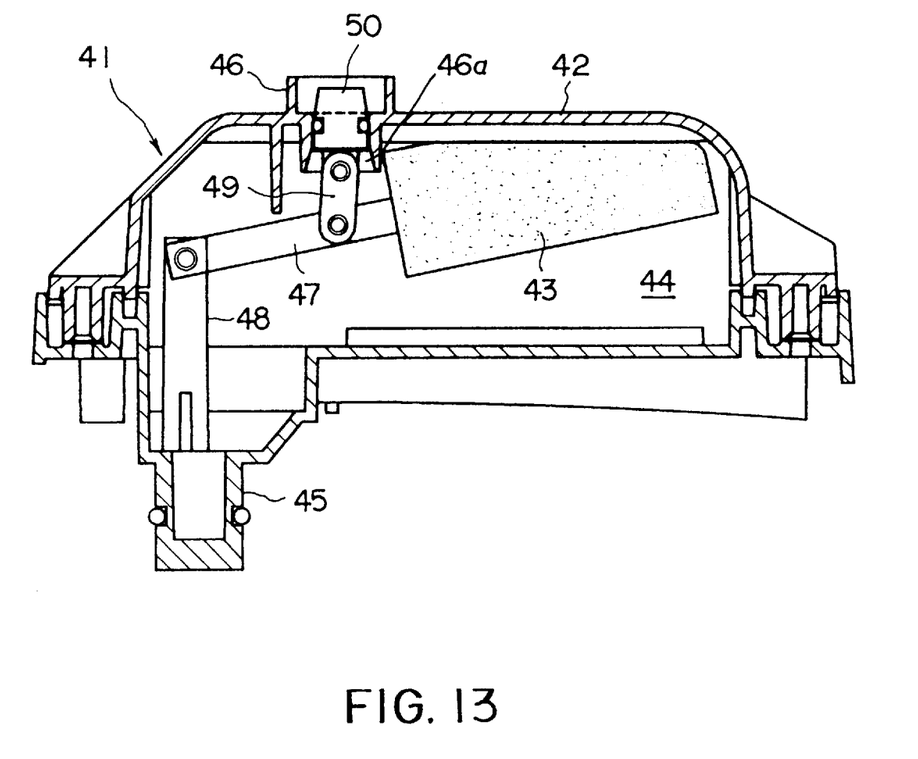
FIG. 13 is a longitudinal sectional view for illustrating a state of the exhaust unit of FIG. 11 during the operation thereof.

The exhaust unit 41 is configured as illustrated in FIGS. 12 and 13, in which a float chamber 44 for accommodating a float 43 floating on water is formed in a main body casing 42. The main body casing 42 is formed integrally with an inlet end portion 45 and an outlet end portion 46, each of which communicates with the float chamber 44.

The float 43 has a left end to which a horizontal pivot link 47 is fixed, and an end portion of the pivot link 47 is pivotally movably attached to the top end portion of a vertical fixed link 48, as viewed in the figures. The bottom portion of the fixed link 48 is fixed to an inner wall of a main body case 45, as illustrated in the figures.

An erect up-and-down link 49 is pivotally movably attached to the side end portion of the float 43 through the pivot link 47. A valve element 50, which can freely go into and out of the outlet end portion 46, is attached to the top portion of the up-and-down link 49. Normally, an outlet passage 46a is opened by the empty weight of each of the valve element 50 and the float 43. Further, an O-ring is fixedly fitted onto the outer peripheral surface of the body of the valve element 50, so that the valve element 50 is water-tightly brought into intimate contact with the outlet passage 46a. Further, the inlet end portion 45 of the main body case 42 is connected air-tightly, water-tightly and detachably with the outlet end portion 7a of the filtration device 4 through the O-ring fixed onto the outer peripheral surface of the body thereof.

Next, an operation of the exhaust unit 41 having the structure described above will be described hereunder.

In the case that the drainage pump 21 of FIG. 4 is normally operated, the water contained in the main body casing 10 of the filtration device 4 repeatedly performs rising and falling operations by the tidal action of the flow rate control unit 11 as described above.

Further, in the case that the water contained in the main body casing 10 rises to the high-tide water level, the air contained in the main body casing 10 is thrusted by the rising water surface. Subsequently, the air flows into the float chamber 44 through the inlet end portion 45 of the exhaust unit 41 from the outlet end portion 7a. At that time, the passage 46a in the outlet end portion 46 is opened as a result of the descent of the valve element 50 and the float 43 owing to the empty weight thereof. Thus, the air having flown into the float chamber 44 is exhausted to the exterior through the opened outlet passage 46a.

In contrast, in the case that the water contained in the main body casing 10 falls to the low-tide water level, the pressure caused by the space in the main body casing 10 is reduced to a negative pressure by the falling water surface. Thus, the air is drawn into the main body casing 10 through the opened outlet passage 46, the float chamber 44 and the inside of the inlet end portion 45 of the exhaust unit 41 and through the outlet end portion 7a of the filtration device 4 in sequence.

Namely, the air contained in the filtration device 4 is exhausted to the exterior through the exhaust unit 41 according to the high-tide or low-tide water level, while the outside air is drawn into the main body casing 10.

Namely, in the case of this embodiment, since the exhaust hose of FIG. 1 is omitted, the aesthetic outside appearance of the device can be improved. Moreover, the exhaust gas is blown on the water surface of the water contained in the aquarium tank 2, whereas the outside air is not drawn thereinto. Consequently, bubbles can be prevented from being generated on the water surface of the water contained in the aquarium tank 2. Further, the aesthetic outside appearance can be improved.

Moreover, the exhaust and intake of air are repeatedly performed by using the exhaust hose 7 when a normal operation is carried out. Thus, even if water is accumulated in the exhaust hose 7 owing to some cause, this stagnant water is blown up in the exhaust hose every exhaust or intake. This is very noisy. In the case of the device of this embodiment, this exhaust hose 7 is omitted. Consequently, such noises can be prevented from being caused.

Furthermore, even if the water having been contained in the main body casing 10 of the filtration device 4 flows from the outlet end portion 7a through the inlet end portion 45 of the exhaust unit 41 into the float chamber 44 and comes to have a predetermined water level when the drainage pump 21 stops operating owing to failure or the like, the float 43 is floated as illustrated in FIG. 13. Thus, the valve element 50 is caused to rise and the outlet passage 50 is closed water-tightly.

Therefore, the water having flown into the float chamber 44 can be prevented from being drained to the exterior from the outlet end portion 46. Consequently, the surroundings can be prevented from being stained by the drained water.

What is claimed is:

1. A filtration device for filtering and cleaning water to be supplied to a water tank, comprising:

a main body having an upper end opening selectively closed by a lid mounted to said main body in an installed state;

a filtering means detachably disposed in the main body;

an exhaust means respectively communicating with the inside and the outside of the main body;

a water inlet means connected to the main body;

a feed water pipe connected to the water inlet means for supplying raw water into the main body;

a drainage pump means for draining clean water cleaned by the filtering means;

a water outlet means operatively connected to the filtering means and pump means to supply the clean water to the water tank; and a flow rate control unit, detachably incorporated into the main body and connected to the feed water pipe, for controlling a flow rate of raw water in a manner that a water level of water contained in the main body alternatively has a high-tide water level, at which the filtering means is covered with water, and a low-tide water level which is lower than a location of the filtering means.

2. A filtration device according to claim 1, wherein said lid mounted to the opening of the main body is provided with said exhaust means, said water inlet means and said water outlet means which are respectively mounted thereto to be at least one of water-tight and air-tight.

3. A filtration device according to claim 2, wherein said exhaust means is an exhaust pipe having one end disposed inside the water tank at a portion above a water level of water in the water tank and structurally adapted to inhale or exhale air in response to the high and the low tide water levels of the filtration device.

4. A filtration device according to claim 2, wherein said water outlet means comprises a drainage hose having one end connected to the filtering means.

5. A filtration device according to claim 1, wherein said water inlet means comprises a feed water hose.

6. A filtration device according to claim 1, wherein a drainage extension pipe is further disposed to be detachably connected to a suction opening of the drainage pump means and is opened at a level lower than the filtering means provided in the main body.

7. A filtration device according to claim 1, wherein said feed water pipe has an upper end in an installed state communicated in a water-tight manner with the water inlet means and a closed lower end, said feed water feed pipe having a side wall defining a plurality of feed water holes, the lower end of said feed water pipe being located in the flow rate control unit.

8. A filtration device according to claim 7, wherein a slider sleeve is further mounted to an outer periphery of the feed water pipe to be axially slidable, and said flow rate control unit comprises an open/close float mounted to the slider sleeve, which is axially slidable by a floating force of the open/close float.

9. A filtration device according to claim 8, wherein said high- and low-tide water level floats are engageable with said slider sleeve.

10. A filtration device according to claim 1, wherein said filtering means comprises a filter case and a filtering material disposed in a laminated manner in the filter case, said filtering material comprising a porous material.

11. A filtration device according to claim 10, wherein said filter case comprises one side wall section which faces the flow rate control unit and which is formed by a blind plate, another side wall section and a bottom wall section which are formed with a plurality of water communication holes.

12. A filtration device according to claim 11, wherein said filter case further comprises an upper stage case element and a lower stage case element stacked vertically and said flow rate control unit comprises a high-tide water level float and a low-tide water level float which are respectively movably attached to the upper and lower stage case elements.

13. A filtration device according to claim 10, wherein said porous material is made from ceramics.

14. A filtration device according to claim 10, wherein said porous material is made from aluminum.

15. A filtration device according to claim 1, wherein said lid mounted to the opening of the main body is provided with said exhaust means, said water inlet means and said water outlet means which are mounted thereto in at least one of a water-tight and air-tight manner, said exhaust means comprises an exhaust device provided with a float chamber in which a float is disposed and a case body formed with an inlet portion and an outlet portion and which the float chamber.

* * * * *